Sept. 27, 1949.   A. LA C. SPILLMAN   2,483,111
SELF-LOCKING HITCH PIN
Filed April 23, 1946

INVENTOR
AMOS LACLAIR SPILLMAN
BY
*Merrill M. Blackburn*
ATTORNEY

Patented Sept. 27, 1949

2,483,111

UNITED STATES PATENT OFFICE 2,483,111

SELF-LOCKING HITCH PIN

Amos La Clair Spillman, Charlotte, Iowa

Application April 23, 1946, Serial No. 664,212

2 Claims. (Cl. 280—33.15)

This invention pertains to means for hitching a tractor to a vehicle to be drawn and more particularly to improvements upon prior hitch pins. Among the objects of this invention are the provision of an improved pin for the purpose stated; the provision of a pin which is provided with means for automatically holding the hitch pin in place so that it cannot bounce out; the provision of a device of the character stated which has means connected thereto which renders it unnecessary for the driver of a tractor to dismount from his seat in order to unhitch from the drawn vehicle; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention and a modification thereof, I desire the same to be understood as illustrative only and not to be interpreted in a limiting sense.

In the drawings annexed hereto and forming a part hereof,

Figure 1:
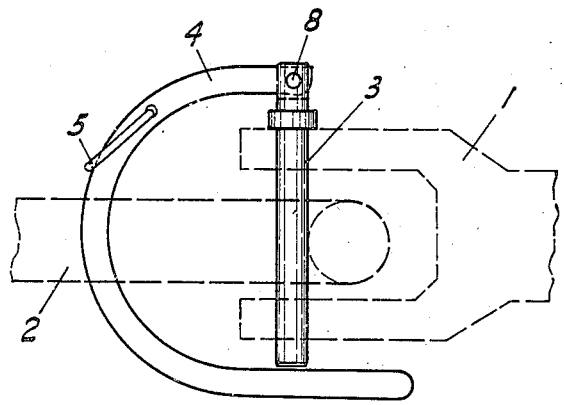
Fig. 1 represents a side elevation of my new hitch pin in position for securing a tractor drawbar and the tongue of a drawn vehicle in operative position.
Figure 2:
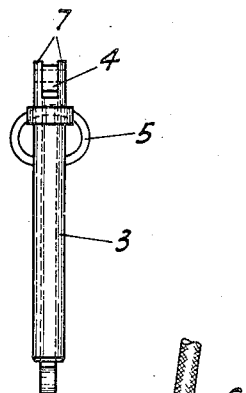
Fig. 2 represents a front elevation of the structure shown in Fig. 1.

Reference will now be made in greater detail to the annexed drawings for a more complete description of this invention. The drawbar 1 of the tractor is ordinarily connected to the tongue 2 of the drawn vehicle by a hitch pin. I have found that, by connecting to the hitch pin 3 a U-shaped latching member 4 which is pivotally connected to the pin to swing in a vertical direction, it is possible for the driver, by pulling on the cord 6 connected to the ring 5, to lift the latching member 4 into such a position that its lower end will be withdrawn from below the pin 3, thus making it possible to pull the pin out of the drawbar merely by pulling on the cord, cable, or chain 6. As shown clearly in Fig. 2, the pin 1 is provided at its upper end with a pair of ears 7 between which the latching member is pivoted by the pivot pin 8. It is therefore obvious from this that a mere pull on the cable 6 will lift the latching member 4 out of latching position and will then pull the pin 3 out of the drawbar so that the driver of the tractor can drive it away. The pivoted end of latching member 4 is provided with a square shoulder to engage the wall at the bottom of the opening between the ears 7, thus preventing the latching member 4 from turning beyond a vertical position.

This construction has the further advantage that there is no danger of losing the hitch pin 3 because the cable 6 is permanently attached thereto and may be tied to the seat of the tractor or to some other part thereof so that it cannot be inadvertently mislaid.

Figure 5:
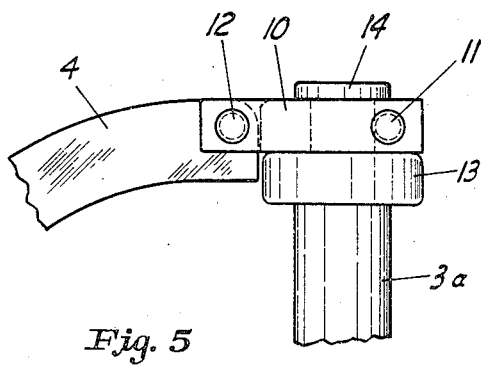
Fig. 5 represents a fragmentary elevation of another form of this invention.
Figure 3:
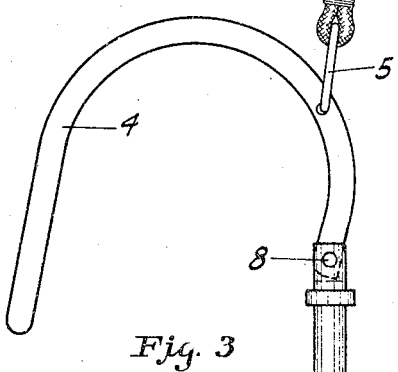
Fig. 3 represents a side elevation of my invention with a cable attached thereto and holding the latching member in unlatching position so that the pin may be withdrawn from the holes in the tractor drawbar.
Figure 6:
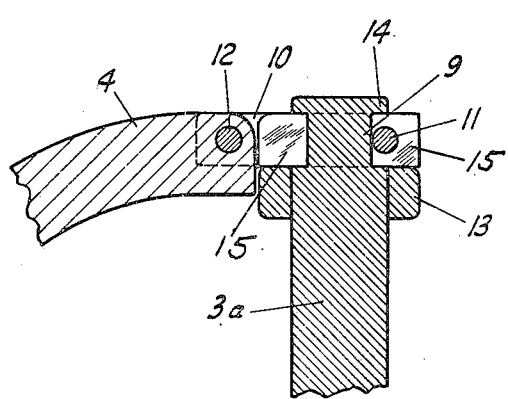
Fig. 6 represents a longitudinal section of the structure shown in Fig. 5.
Figure 4:
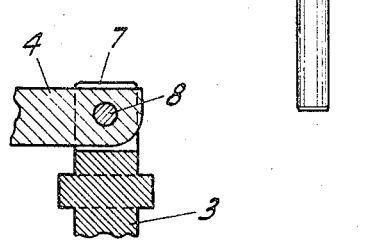
Fig. 4 represents a fragmentary longitudinal section of the pin and its latching means.

In the form of my invention shown in Figs. 5 and 6, the pin 3a replaces the pin 3, being provided at its upper end with a reduced portion or neck 9 between the body of the pin and the flange or head 14. A pair of links 10 engage opposite sides of the end of the latching member 4 and, also, the neck 9, being held in place by the pins, rivets, or bolts 11 and 12. A collar 13 is pressed on the body 3a and fits tightly enough that it retains its place without being welded, brazed, or otherwise secured. Lugs 15 may be provided, if desired, to hold the links 10 against being drawn in too tightly against the neck 9. These lugs also help to position the pin 3a with relation to the links 10 and the latching member 4. The pin 3a should turn freely between the links in order that, when making a turn, the member 4 will not be bent by engagement with the tongue 2.

This application is a continuation in part of my application, Serial No. 625,248, filed October 29, 1945, now abandoned.

While I have disclosed herein what is now regarded as the preferred embodiment of this invention, I desire the same to be understood as illustrative only and not to be interpreted in a limiting sense.

Having now described my invention, I claim:

1. A connecting means for connecting a tractor drawbar to the tongue of a drawn vehicle comprising a pin having a U-shaped latching member pivotally connected to the upper end of the pin which is reduced in diameter and fits in an opening in an element of the latching member, the parts being so constructed and connected that the latching member turns in a horizontal direction about the upper end of the pin, a connecting element connecting the pin and the U-shaped latching member, and a horizontal pivot connecting the latching member and the connecting element so that the latching element may turn in a vertical direction relatively to the pin.

2. A hitch pin for connecting a tractor and a drawn vehicle comprising a pin, said pin having a groove formed therein near the upper end thereof whereby to result in a body, a head, and a cylindrical neck connecting them, a generally U-shaped latching member, and a connecting unit having pivotal connection to each of them, the connection between the pin and the connecting unit being such that the connecting unit may turn in a horizontal direction, and the pivot connecting the latching member and the connecting unit being arranged at substantially a right angle to the pivot between the pin and the connecting unit.

AMOS LA CLAIR SPILLMAN.

REFERENCES CITED

The following references are of record in the file of this patent:

UNITED STATES PATENTS

| Number | Name | Date |
|---|---|---|
| 2,077,825 | Davidson | Apr. 20, 1937 |
| 2,180,558 | Stastny | Nov. 21, 1939 |
| 2,224,522 | Peterson | Dec. 10, 1940 |
| 2,367,874 | Kelley | Jan. 23, 1945 |
| 2,436,210 | Fuhrer et al. | Feb. 17, 1948 |

FOREIGN PATENTS

| Number | Country | Date |
|---|---|---|
| 532,113 | Germany | Aug. 25, 1931 |